United States Patent
Lee et al.

(10) Patent No.: US 8,896,558 B2
(45) Date of Patent: Nov. 25, 2014

(54) PORTABLE COMPUTER WITH ADJUSTABLE TOUCH SCREEN DISPLAY

(75) Inventors: Shang-Mao Lee, New Taipei (TW); Chun-Chien Chen, New Taipei (TW); Hung-Chih Chen, New Taipei (TW); Cheng-Hsiang Chuang, New Taipei (TW); Chia-Lian Yen, New Taipei (TW)

(73) Assignee: Wistron Corporation, New Taipei (TW)

( * ) Notice: Subject to any disclaimer, the term of this patent is extended or adjusted under 35 U.S.C. 154(b) by 109 days.

(21) Appl. No.: 13/616,071

(22) Filed: Sep. 14, 2012

(65) Prior Publication Data

US 2013/0127730 A1    May 23, 2013

Related U.S. Application Data

(60) Provisional application No. 61/561,312, filed on Nov. 18, 2011.

(30) Foreign Application Priority Data

Apr. 12, 2012 (TW) .............................. 101113050 A

(51) Int. Cl.
*G06F 3/041* (2006.01)
*H05K 5/00* (2006.01)
*H05K 7/00* (2006.01)
*G06F 1/16* (2006.01)

(52) U.S. Cl.
CPC ............ *G06F 1/1637* (2013.01); *G06F 1/1681* (2013.01); *G06F 1/1679* (2013.01); *G06F 1/1624* (2013.01); *G06F 1/1616* (2013.01)
USPC ........................ 345/173; 248/371; 361/679.27

(58) Field of Classification Search
CPC ... G06F 1/1616; G06F 1/1624; G06F 1/1679; G06F 1/1681; G06F 1/1637
USPC ............ 349/58; 248/371, 922, 923; 345/169, 345/905; 455/575.1, 575.3, 575.4; 361/679.01, 679.09, 679.21, 679.26, 361/679.27, 679.28, 679.55, 724–727; 312/223.2; D14/315, 345
See application file for complete search history.

(56) References Cited

U.S. PATENT DOCUMENTS

| | | | | |
|---|---|---|---|---|
| 5,200,913 | A * | 4/1993 | Hawkins et al. | 361/679.09 |
| 5,771,152 | A * | 6/1998 | Crompton et al. | 361/679.27 |
| 6,826,043 | B2 * | 11/2004 | Chang | 361/679.27 |
| 7,106,579 | B2 * | 9/2006 | Maskatia et al. | 361/679.28 |

(Continued)

FOREIGN PATENT DOCUMENTS

| | | |
|---|---|---|
| CN | 2174715 Y | 8/1994 |
| TW | 426174 U | 3/2001 |

(Continued)

OTHER PUBLICATIONS

Taiwan Patent Office, Office Action of corresponding Taiwan Application No. 101113050 (including 6 pages English translation of marked portion of pp. 1-13 of Office Action), issued Sep. 17, 2014, 26 pages.

*Primary Examiner* — Dwayne Bost
*Assistant Examiner* — Larry Sternbane
(74) *Attorney, Agent, or Firm* — Alan Kamrath; Kamrath IP Lawfirm, P.A.

(57) ABSTRACT

A portable computer includes a base, a display module, at least one support element and at least one sliding assembly. The base includes a first area and a second area. The display module includes a connect end and a display face. Each support element comprises a first end pivoted on a portion of the display module other than the display face and a second end pivoted on the rear end of the base. Each sliding assembly includes a rod element disposed at least in the second area and a sleeve sliding element connected with the connect end and moved along the rod element.

24 Claims, 13 Drawing Sheets

(56) References Cited

U.S. PATENT DOCUMENTS

| | | | |
|---|---|---|---|
| 7,184,263 | B1 | 2/2007 | Maskatia |
| 7,203,058 | B2 * | 4/2007 | Hong ................. 361/679.06 |
| 8,196,264 | B2 * | 6/2012 | Zhou et al. ................. 16/367 |
| 2006/0077622 | A1 | 4/2006 | Keely et al. |
| 2007/0030634 | A1 | 2/2007 | Maskatia |
| 2010/0309612 | A1 | 12/2010 | Liang et al. |

FOREIGN PATENT DOCUMENTS

| | | | |
|---|---|---|---|
| TW | 556583 | U | 12/2003 |
| TW | 584227 | U | 4/2004 |
| TW | M243748 | U | 9/2004 |
| TW | 1784133 | A | 6/2006 |
| TW | 2000707220 | | 2/2007 |
| TW | M323952 | U | 12/2007 |
| TW | 200815963 | A | 4/2008 |
| TW | 200827832 | A | 7/2008 |
| TW | M367554 | U | 10/2009 |
| TW | M398651 | U | 2/2011 |
| TW | 201128355 | A | 8/2011 |

\* cited by examiner

PORTABLE COMPUTER WITH ADJUSTABLE TOUCH SCREEN DISPLAY

BACKGROUND OF THE INVENTION

1. Field of the Invention

The present relates to a portable computer and, more particularly, to a portable computer which can move a display towards a user and keep the display at a tilted angle.

2. Description of the Related Art

Computing devices have become an indispensable part of our daily life. With the fast development of touch technologies, most hand-held devices or electronic devices such as a tablet PC, smart phone, and PDA now provide touch panels instead of a mouse or keyboard as input devices, and these devices are equipped with an operating system supporting touch functions to enable intuitive and convenient operations.

As notebook PCs are usually equipped with QWERTY keyboards and touch pads for input functions and as they also use an operating system which does not support touch functions or interfaces which cannot recognize touch gestures, few notebook PCs provide touch functions or designs in the past. However, as software vendors are rolling out new operating systems which can support touch functions and as people are becoming familiar with touch gestures required to operate tablet PCs or smart phones, it is now necessary for manufactures to provide touch functions on notebook PCs or even transform their notebook PCs into tablet PCs. Due to a certain weight of the display, when a user opens the display to a suitable angle relative to the base for touch operations, the display is kept in a fixed position by a reactive torsion of a pivot bearing between the display and the base. However, when the user touches the display, a torque generated by the applied force and the distance between the point of applied force and the pivot bearing would cause the display to vibrate back and forth, making it inconvenient for the user to perform any touch function and making it hard to see the display clearly. Furthermore, when the user applies too much force on the display, the display could topple and fall backwards without proper support, and the display could be damaged to discourage the user to perform any touch function.

Therefore, a prior art technique discloses a support arm for supporting and pivotally connecting to the display.

In a prior art technique such as Taiwan patent Patent No. 1316666 (U.S. Pat. No. 7,184,263 B1), a portable computer uses a sheet-like support element to support a display and to let the display slide relative to the computer body via guide grooves on both sides of the keyboard to stand upright. However, this design can only apply for tablet PCs which have their displays faced upwards in a normal state and is not suitable for notebook PCs which usually have their displays faced down and towards a keyboard when not in use. Therefore, the patent is designed specifically for tablet PCs having their display exposed outwardly and allowing the user to slide the display to a tilted angle for operations. However, the display is not well protected, since it is exposed in many circumstances.

In another prior art technique such as Taiwan patent No.566583, a notebook PC having its display rotatably moved relative to a base via a plurality of connecting rods to change a viewing angle for the user. However, this patent comprises a complicated design which involves the operations of pivoting, linking and sliding and various linkage elements to work. Therefore, it is disadvantageous to assemble and to operate the mechanism. Besides, with a complicated mechanism and exposed support and linkage mechanisms on both sides of the display, it is aesthetically unpleasant, and it is possible to hurt the user if the user's finger accidentally gets pinched between these mechanisms. Additionally, the prior art technique requires reserved spaces for disposing grooves and pivoting mechanisms on both sides of the base, and it also requires additional spaces for disposing support elements on both sides of the display case as well. Thus, the whole thing tends to be bulky and thick, and it could sacrifice the viewable area of the display.

Therefore, it is necessary to provide a structure which can stably support the display and slide the display to a suitable angle for the portable computer.

SUMMARY OF THE INVENTION

It is an object of the present invention to provide a portable computer which can stably move a display towards a user and keep the display at a tilted angle.

In order to achieve the above object, the present invention discloses a portable computer which comprises a base, a display module, at least one support element and at least one sliding assembly. The base comprises, between a front end and a rear end, a first area disposed at a front side of the base and a second area disposed at a rear side of the base. The display module comprises a connecting end, a display face and a support plane opposite to the display face. Each support element comprises a first fixed end and a second fixed end. The first fixed end is pivotally connected to a portion of the display module other than the display face, such that the display module is able to rotate relative to the support element. The second fixed end is pivotally connected to the rear end or in proximity of the rear end of the base, such that the support element is able to rotate relative to the base. Each sliding assembly comprises a rod element and a sleeve sliding element sleeved onto the rod element. The rod element is at least disposed in the second area of the base, the sleeve sliding element is connected with the connecting end of the display module, and the sleeve sliding element can slide along the rod element.

Accordingly, when the display module is opened and rotated to a suitable angle relative to the base via the second fixed end of the at least one support element, the display module can further rotate around the first fixed end of the at least one support element with the first fixed end serving as a pivot point. The connecting end of the display module is driven to move from the second area towards the first area to a suitable position along with the sleeve sliding element, and, then, the display module is supported by the at least one support element to keep a suitable tilted angle.

Through the design of the present invention, a user can turn the display module relative to the base, to stably slide the connecting end of the display module driven by a sleeve structure towards the user to a suitable tilted angle via interactions between various pivoting elements and connecting rods. The display module is also supported by the at least one support element to provide a better viewing or operating effect for the user.

Other objects, advantages, and novel features of the invention will become more apparent from the following detailed description when taken in conjunction with the accompanying drawings.

BRIEF DESCRIPTION OF THE DRAWINGS

In the drawings, similar reference numerals denote similar elements throughout the several views.

DETAILED DESCRIPTION OF THE PREFERRED EMBODIMENTS

The advantages and innovative features of the invention will become more apparent from the following detailed description when taken in conjunction with the accompanying drawings.

Figure 1:
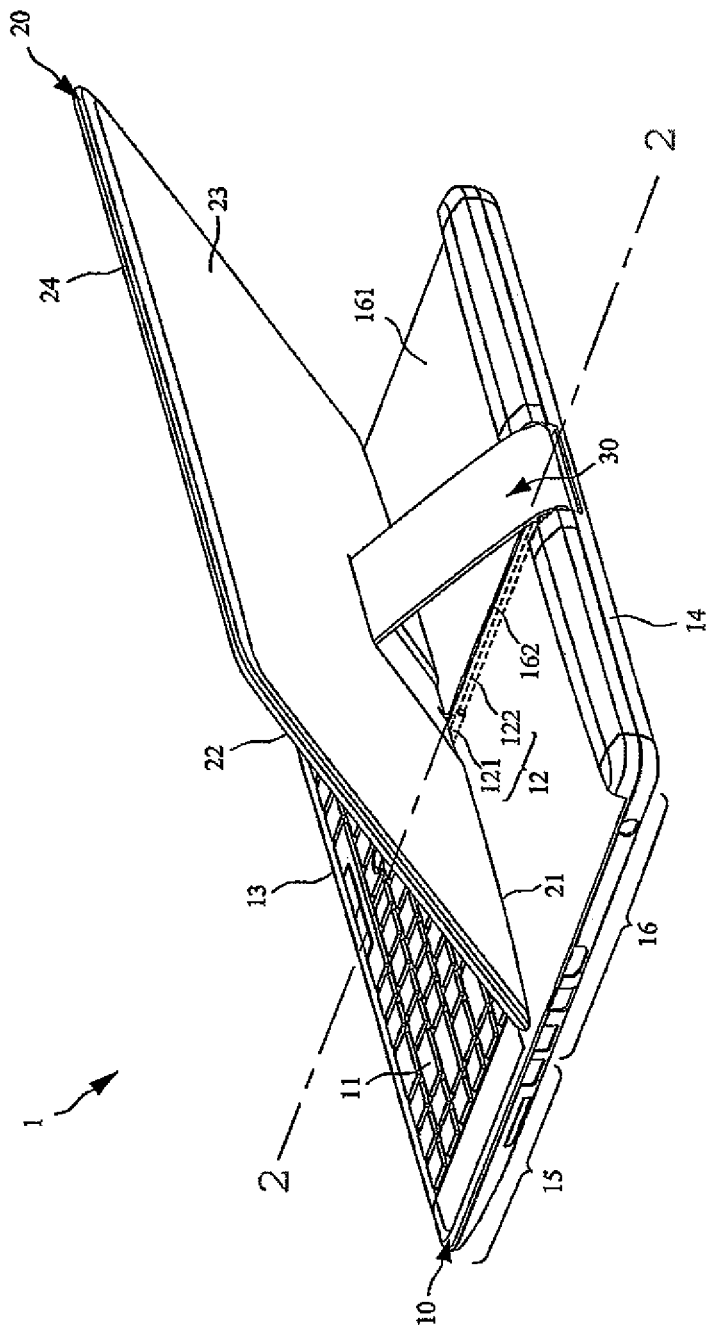
FIG. 1 illustrates a schematic view of a portable computer of the present invention.
Figure 2:
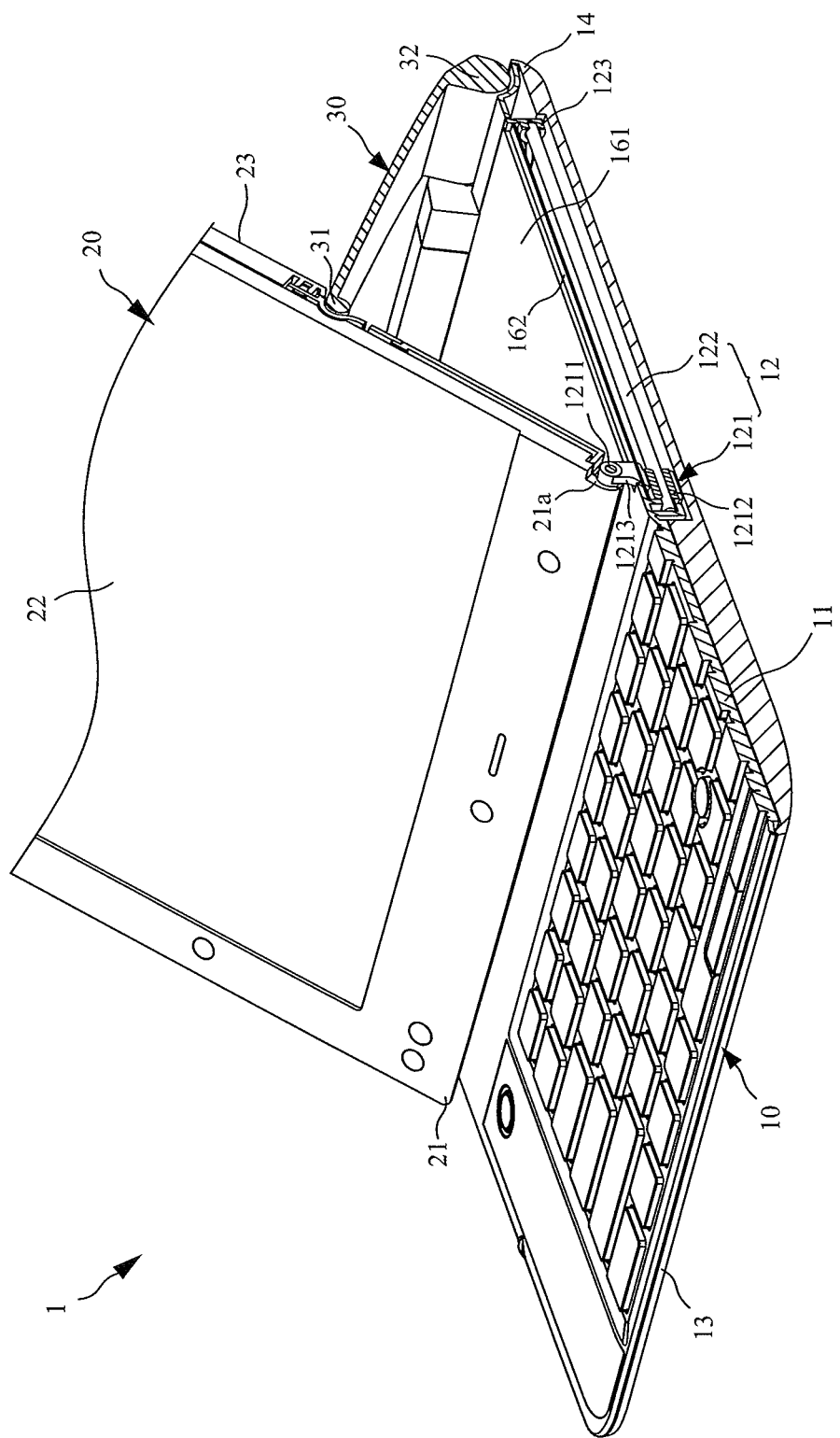
FIG. 2 illustrates a partial cross-sectional view of a first embodiment of the portable computer of the present invention along a central line 2-2 of FIG. 1.

FIG. 1 illustrates a schematic view of a portable computer 1 of the present invention; and FIG. 2 illustrates a partial cross-sectional view of a first embodiment of the portable computer 1 of the present invention. In one embodiment of the present invention, the portable computer 1 is a notebook PC, but according to various application types, the portable computer 1 can also be a tablet PC, a mini laptop, or other electronic devices comprising flip-top type display modules, without limiting the scope of the present invention.

FIG. 2 illustrates the cross-sectional view taken substantially along a central line 2-2 of the portable computer I of the present invention. As shown in FIG. 1 and FIG. 2, the portable computer 1 of the present invention comprises a base 10, a display module 20 and a support element 30. The top of the base 10 is segmented into a first area 15 and a second area 16 between a front end 13 and a rear end 14 of the base 10. The first area 15 is disposed near the front end 13, and the second area 16 is disposed near the rear end 14. The first area 15 is provided for being installed with a keyboard 11 and/or other input devices such as a touch pad or a track point, and the second area 16 comprises a sliding assembly 12. In other embodiments, the sliding assembly 12 can extend forward to a part or all of the first area 15. It is noted that the sliding assembly 12 can be disposed in a central portion of the second area 16 or in a substantially central portion of the second area 16.

Figure 3:
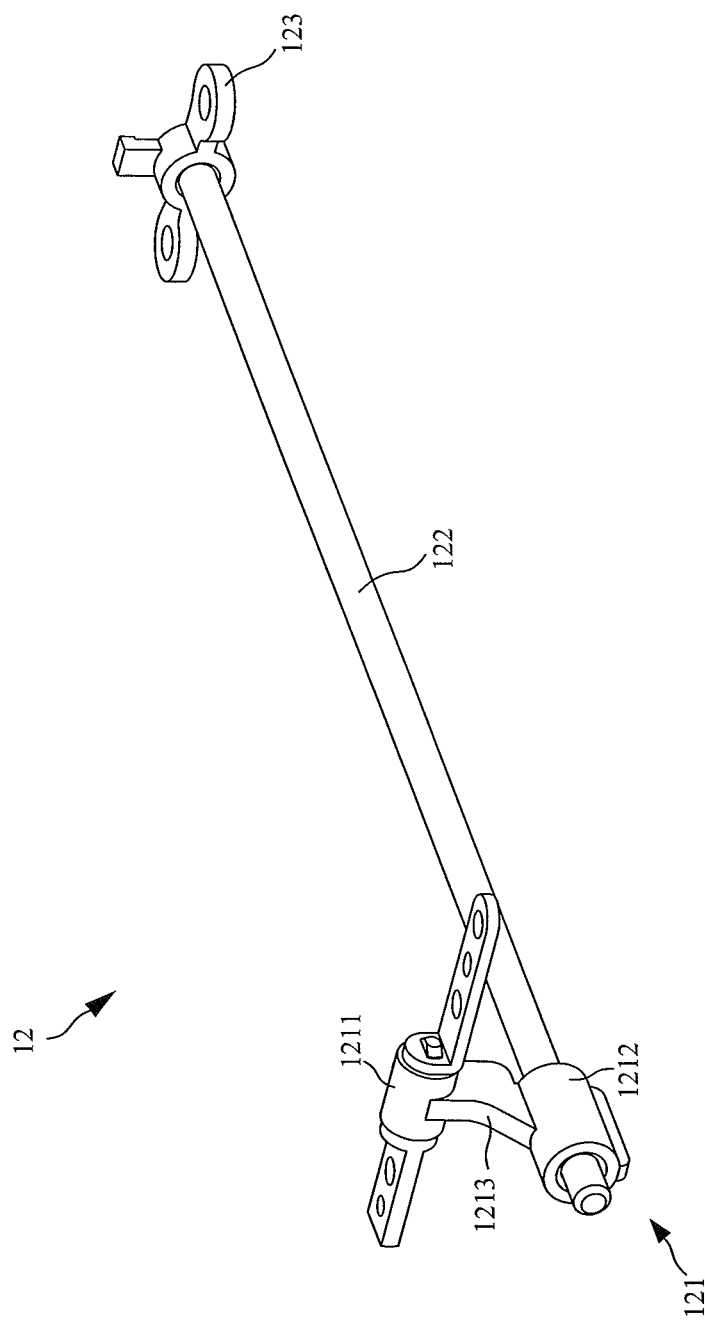
FIG. 3 illustrates a schematic view of the first embodiment of a sliding assembly of the portable computer of the present invention.

Please also refer to FIG. 3, which illustrates a schematic view of the first embodiment of the sliding assembly 12 of the portable computer 1 of the present invention. As shown in FIG. 2 and FIG. 3, the sliding assembly 12 comprises a sleeve sliding element 121 and a rod element 122. The sleeve sliding element 121 is an element combined with both a sliding function and a pivoting function. The sleeve sliding element 121 can be sleeved onto the rod element 122, such that the sleeve sliding element 121 can slide along the rod element 122 to move with respect to the base 10 in the second area 16 between the rear end 14 of the base 10 and the keyboard 11. A slit 162 is disposed in the middle of the surface 161 of the second area 16, and the sliding assembly 12 is disposed at a position at the bottom of the second area 16 corresponding to the slit 162. For example, the rod element 122 can be fixed below the surface 161 via a fixing element 123 and a fixing structure of the base 10. In other embodiments, the sliding assembly 12 can also extend from the second area 16 to the first area 15, so that the slit 162 can be located on the surface of the second area 16 and a part or all of the first area 15, and so that the rod element 122 can be correspondingly disposed at a position below the slit 162.

As shown in FIG. 1 and FIG. 2, the display module 20 comprises a connecting end 21, a display face 22, a support plane 23 and a free end 24. The display face 22 is disposed opposite to the support plane 23. The connecting end 21 is opposite to the free end 24. The display module 20 is pivotally connected to the sleeve sliding element 121 at a central portion 21a of the connecting end 21 such as by a hinge element to form a rotatable pivot point, so that the display module 20 is able to rotate relative to the sleeve sliding element 121. The display module 20 can have a display screen supporting a touch function disposed in the display face 22 for receiving touch control operations from the user.

The support element 30 comprises a first fixed end 31 and a second fixed end 32. The first fixed end 31 is pivotally connected to the support plane 23 of the display module 200 such as by a hinge element to form a rotatable pivot point, so that the display module 20 is able to rotate relative to the support element 30. The second fixed end 32 can also be pivotally connected to the rear end 14 of the base 10 such as by a hinge element to form another rotatable pivot point, so that the support element 30 is able to rotate relative to the base 10.

As shown in FIG. 2 and FIG. 3, in this embodiment, the sleeve sliding element 121 of the sliding assembly 12 comprises a pivoting portion 1211, a sleeve portion 1212 and a connecting portion 1213. The central portion 21a of the connecting end 21 of the display module 20 is pivotally connected to the sleeve sliding element 121 via the pivoting portion 1211. For example, the pivoting portion 1211 can be a hinge element without torsion and can be rotated simply by a pin. Alternately, the pivoting portion 1211 can be a hinge element conventionally disposed between the display screen and the base of a laptop computer and capable of generating torsion or suitable rotation friction. The sleeve portion 1212 is connected to the pivoting portion 1211 via the connecting portion 1213. The sleeve portion 1212 of the sleeve sliding element 121 is sleeved onto the rod element 122. In this embodiment, the sleeve portion 1212 is a hollow cylinder structure having a slightly larger inside diameter suitable for matching with the diameter of the rod element 122. Please note that the sleeve portion 1212 can also adopt a C-shaped sleeve structure having an opening, or other equivalent structure, that can encircle or place across the rod element 122. The sleeve portion 1212 itself can, but is not limited to, be made of a material with a lubricant effect, such as a stainless steel material with self-lubricating characteristics, to improve the sliding effect of the sleeve sliding element 121. Likewise, the rod element 122 can also be made of the material with the same characteristics. Of course, the rod element 122 can be applied with lubricating oil to reduce friction with the sleeve portion 1212.

In order to comply with the uniformity and the sense of design of the portable computer 1, the rod element 122 of the sliding assembly 12 is disposed below the surface 161 of the second area 16 of the base 10, and corresponds to the position of the slit 162 to have a hidden disposition. The structure of the sleeve sliding element 121 of the sliding assembly 12 corresponds to the slit 162 of the surface 161 of the base 10. The slit 162 has a width smaller than the outside diameter of the sleeve portion 1212 and not smaller than the thickness of the connecting portion 1213. However, there is an exception that the width of the slit 162 can be smaller than the thickness of the connecting portion 1213 if an elastic material, such as flannel, is applied in the structure of the slit 162. Therefore, the connecting portion 1213 of the sleeve sliding element 121 can go through and move along the slit 162, and the pivoting portion 1211 can protrude out of the surface 161 of the base 10, so that the connecting end 21 of the display module 20 and the pivoting portion 1211 can be pivotally connected to each other. With this implementation, aside from the exposed pivoting portion 1211 of the sleeve sliding element 121 and a part of the connecting portion 1213, the other portions of the sleeve sliding element 121 and the rod element 122 can be hidden below the surface 161 of the base 10. While the exposed pivoting portion 1211 and the surface 161 of the base 10 are spaced apart by the partially exposed connecting portion 1213 to keep a spacing, the display module 20 pivotally connected to the pivoting portion 1211 can rotate smoothly without running into the base 10. Therefore, the present invention can provide a design which is both aesthetically appearing and practical in enabling the operation between the sleeve sliding element 121 and the display module 20.

Figure 4:
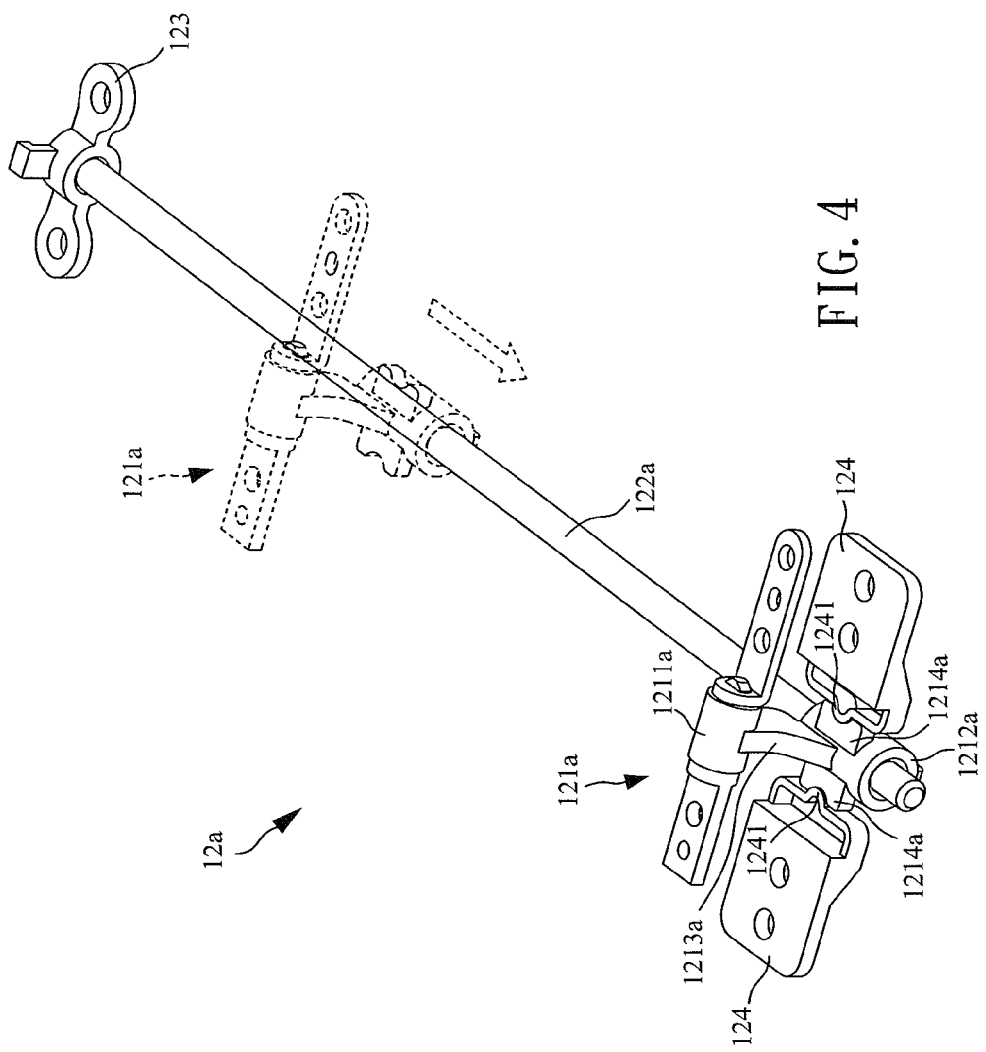
FIG. 4 illustrates a schematic view of a second embodiment of the sliding assembly of the portable computer of the present invention.

Please refer to FIG. 4, which illustrates a schematic view of a second embodiment of the sliding assembly 12a of the portable computer 1 of the present invention. This embodiment is a variation of the abovementioned first embodiment. Please note that, being the same as the above design, the sliding assembly 12a in FIG. 4 is disposed below the surface of the base. In order to clearly show the operations of the sliding assembly 12a, the base and its surface are not illustrated in the figure. As shown in FIG. 4, in this embodiment, the sliding assembly 12a further comprises at least one positioning element 124. Each positioning element 124 is correspondingly disposed to a fixed point adjacent to the rod element 122a. The position of the fixed point can be determined according to an arrangement angle after the display module slides along the sleeve sliding element 121a. Each positioning element 124 is installed with an interference portion 1241, such as a convex point or an elastic piece, and the positioning element 124 can provide an elastic positioning function by associating with the arrangement of an elastic element or the elasticity of its own.

The sleeve sliding element 121a further comprises a pivoting portion 1211a, a connecting portion 1213a, and at least one positioning portion 1214a. Each positioning portion 1214a is connected to the sleeve portion 1212a, and the position of the positioning portion 1214a corresponds to the position of the abovementioned positioning element 124. Each positioning portion 1214a is installed with a corresponding interference portion, such as a concave portion or an interference element, corresponding to the interference portion 1241 of the positioning element 124.

Generally, the sleeve sliding element 121a can freely move along an extended direction of the rod element 122a, such as the sleeve sliding element 121a illustrated in dotted lines in FIG. 4. When the sleeve sliding element 121a moves along the rod element 122a to the fixed point installed with the positioning element 124, the sleeve sliding element 121a can generate a positioning effect by utilizing its positioning portion 1214a to associate with the interference portion 1241 of each positioning portion 124 with elasticity. Accordingly, the present invention provides a positioning function for the display module to move to any fixed point along with the sleeve sliding element 121a.

Figure 5A:
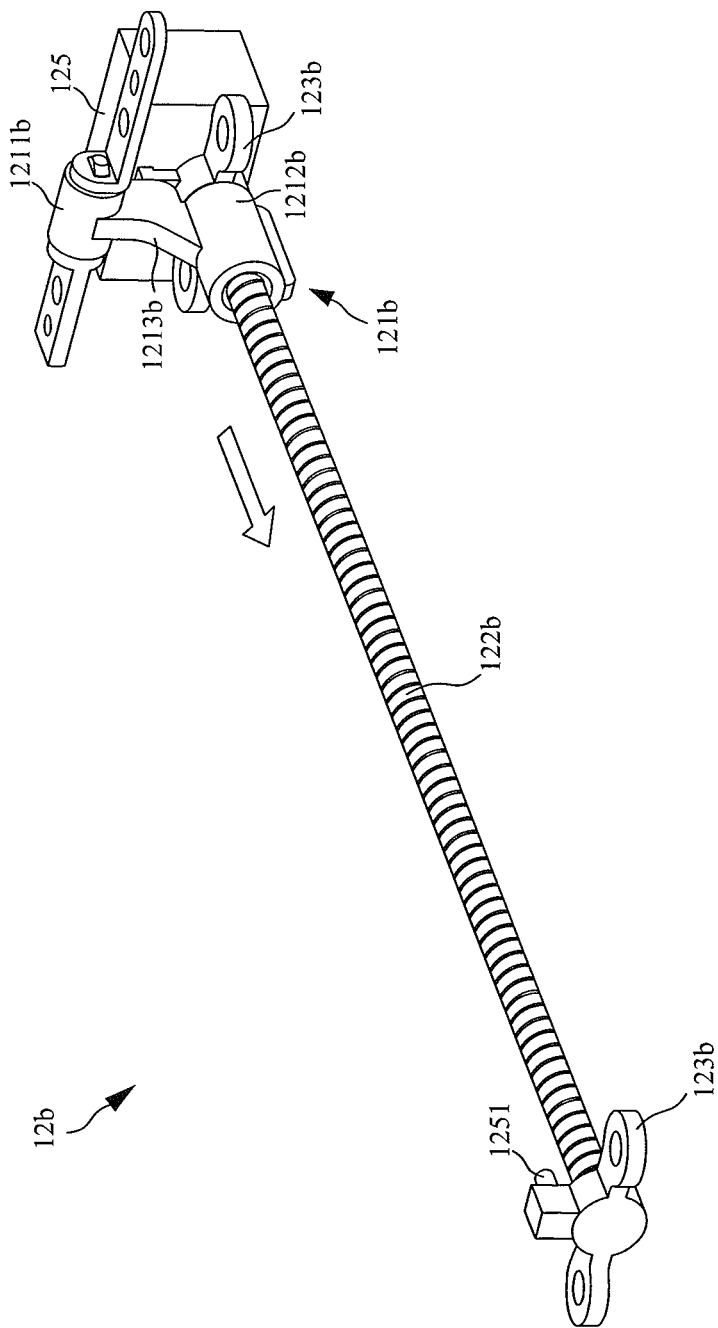
FIG. 5(a) illustrates a schematic view of a third embodiment of the sliding assembly of the portable computer of the present invention.
Figure 5B:
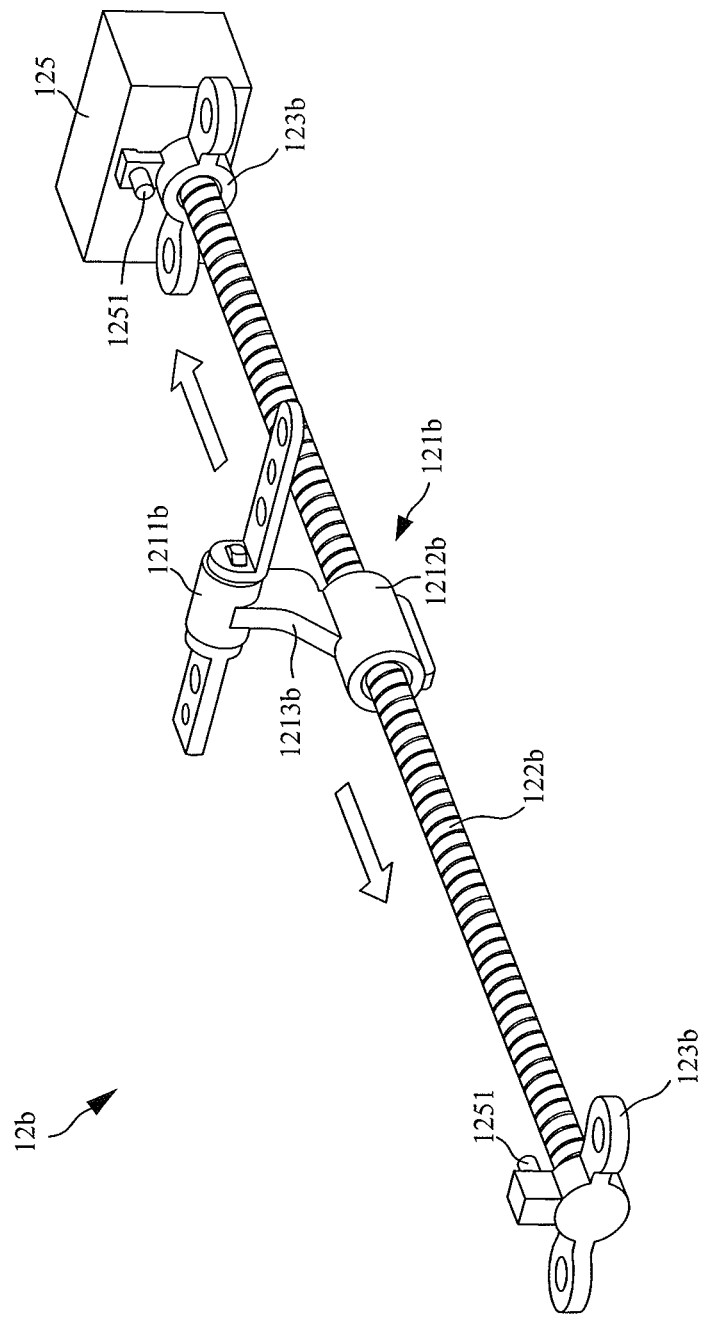
FIG. 5(b) illustrates another schematic view of the third embodiment of the sliding assembly of the portable computer of the present invention.

Please refer to FIG. 5(a) and FIG. 5(b). FIG. 5(a) illustrates a schematic view of a third embodiment of the sliding assembly 12b of the portable computer 1 of the present invention; and FIG. 5(b) illustrates another schematic view of the third embodiment of the sliding assembly 12b of the portable computer 1 of the present invention. This embodiment is a variation of the abovementioned first embodiment. Please note that, being the same as the above design, the sliding assembly 12b in FIG. 5(a) and FIG. 5(b) is disposed below the surface of the base. in order to clearly show the operations of the sliding assembly 12b, the base and its surface are not illustrated in the figures. As shown in FIG. 5(a), in this embodiment, the sliding assembly 12b further comprises a driving device 125, which is connected to the rod element 122b. The driving device 125 can drive the rod element 122b for driving the sleeve sliding element 121b including a pivoting portion 1211b and a connecting portion 1213b and installed on the rod element 122b to move along the rod element 122b. The driving device 125 can be a linear motor or a servo motor. The rod element 122b is a screw rod with a thread structure installed on an exterior surface of the screw rod. An inner wall of the sleeve portion 1212b of the sleeve sliding element 121b has a corresponding internal thread structure (not shown in the figures) for associating with the thread structure of the rod element 122b. However, please note the scope of the present invention is not limited to the above description.

As shown in FIG. 5(b), when the driving device 125 is driven by receiving a signal, the driving device 125 would drive the rod element 122b to rotate. Meanwhile, by associating the thread structures on mutual contact surfaces of the rod element 122b and the sleeve portion 1212b of the sleeve sliding element 121b, the sleeve sliding element 121b would, according to different rotational directions of the rod element 122b, move toward an opposite direction (as shown in the arrows illustrated in FIG. 5(b)) along the rod element 122b.

Further, as shown in FIG. 5(a) and FIG. 5(b), the driving device 125 comprises at least one limit switch 1251, and each limit switch 1251 is electrically connected to a main body of the driving device 125. When any limit switch 1251 is triggered, it would transmit an electric signal to the main body of the driving device 125, to inform the driving device 125 to stop operations. In this embodiment, each limit switch 1251 passes through and is protruded from the surface of the fixing element 123b, such that when the sleeve sliding element 121b moves close to the fixing element 123 to make contact with the limit switch 1251, the limit switch 1251 would then be triggered. However, the position of the limit switch 1251 is not limited to this embodiment. Accordingly, during the process that the driving device 125 drives the rod element 122b to let the sleeve sliding element 121b generate movement, and when the sleeve sliding element 121b moves to positions close to the fixing elements 123b at two ends of the rod element 122b, the limit switch 1251 can be triggered to stop the driving device 125 from keeping driving the rod element 122b, thereby preventing the sleeve sliding element 121b from keeping moving, as shown in FIG. 5(a).

In order to facilitate user operations, the driving device 125 can further be electrically connected to an operating element (not shown in figures). The operating element can be a button disposed to the base or the display module, such that the user can press the button to activate the driving device 125, to freely control a moving distance of the sleeve sliding element 1221b, thereby correspondingly adjusting a fixed position of the display module. However, the installation type and position of the operating element are not limited to the above description.

Figure 6A:
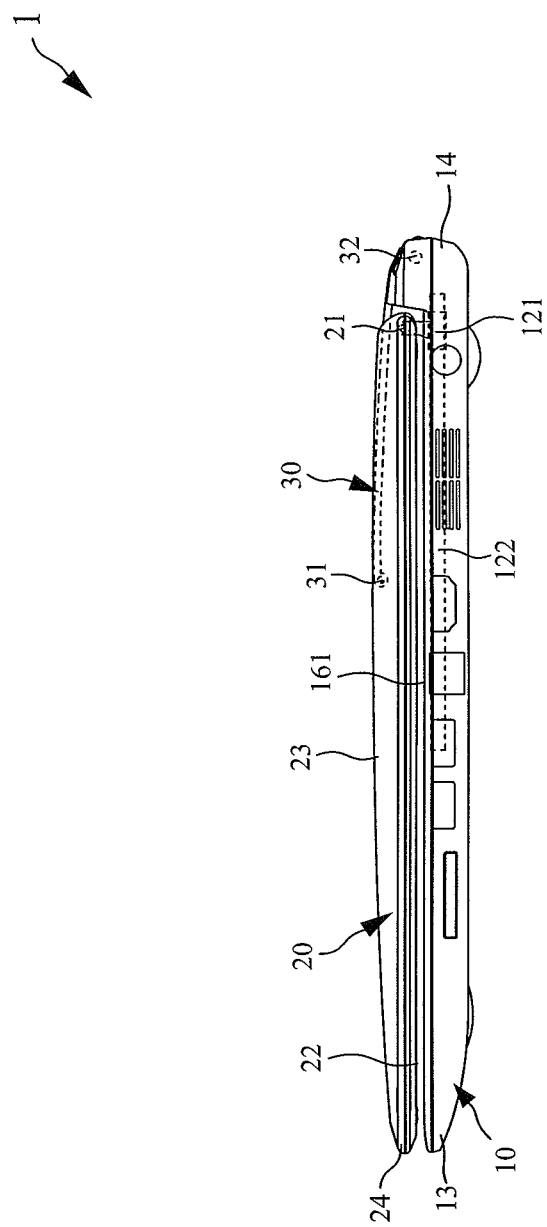
FIG. 6(a) illustrates a schematic view of the first embodiment of the portable computer of the present invention in a closed state.
Figure 6B:
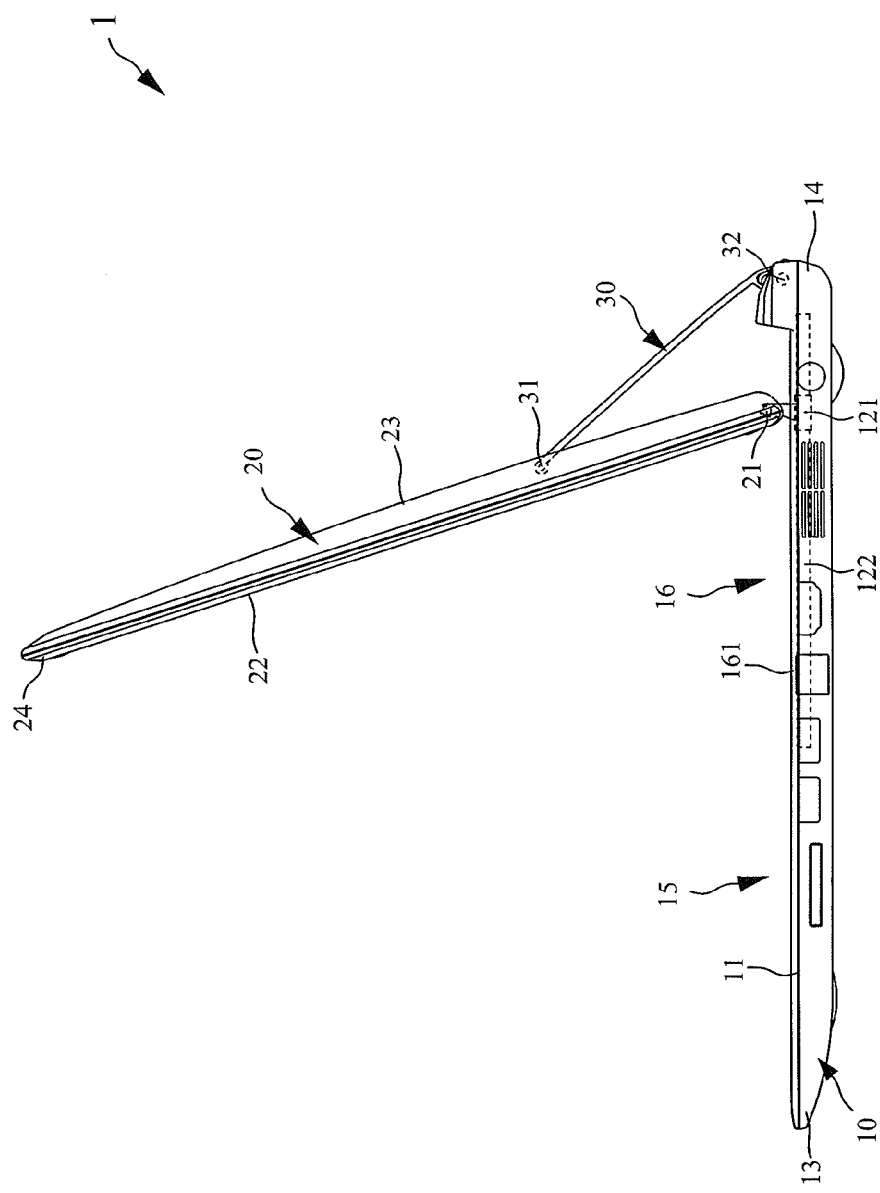
FIG. 6(b) illustrates a schematic view of the first embodiment of the portable computer of the present invention switched from the closed state to an open state.
Figure 6C:
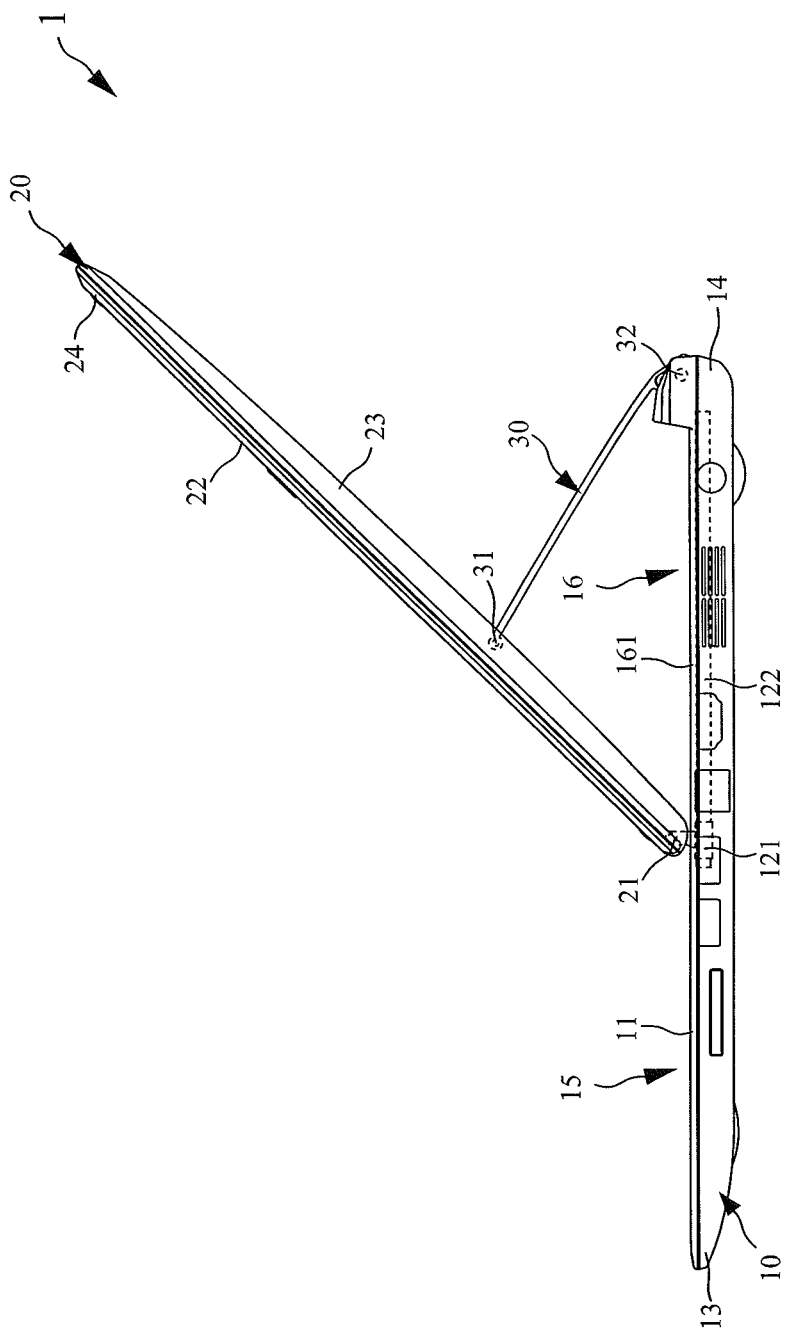
FIG. 6(c) illustrates a schematic view of the first embodiment of the portable computer of the present invention in the open state.

Please refer to FIG. 6(a), FIG. 6(b), and FIG. 6(c). FIG. 6(a) illustrates a view of the first embodiment of the portable computer 1 in a closed state; FIG. 6(b) illustrates a view of the first embodiment of the portable computer 1 switched from the closed state to an open state; and FIG. 6(c) illustrates a view of the first embodiment of the portable computer in the open state. Please note that the structures and the operations of the portable computer 1 of the present invention are illustrated by the first embodiment of the present invention, but other embodiments of the present invention can be applied to execute the same operations; and the present invention is not limited to the present embodiment.

As shown in FIG. 6(a), when the portable computer 1 is in a closed state, the display module 20 overlaps with the base 10 and is pivotally connected to the sleeve sliding element 121 via the connecting end 21, and at this time the display plane 22 of the display module 20 is facing the base 10. The support element 30 also overlaps with the display module 20 and is pivotally connected to the rear end 14 of the base 10 and the display module 20 via the first fixed end 31 and the second fixed end 32 respectively. In this embodiment, when the portable computer 1 is in the closed state, the connecting end 21 of the display module 20 and the second fixed end 32 of the support element 30 are on different axes substantially parallel with each other, and the length of the support element 30 is longer than the distance between the connecting end 21 of the display module 20 and the first fixed end 31 of the support element 30. However, based on different design requirements, the portable computer 1, while in the closed state, can have the connecting end 21 of the display module 20 and the second fixed end 32 of the support element 30 on the same axis to let the support element 30 have a same length as the distance between the connecting end 21 of the display module 20 and the first fixed end 31 of the support element 30.

As shown in FIG. 6(b), when the user exerts a force on the free end 24 opposite to the connecting end 21 of the display module 20 to try to open the display module 20, at first the display module 20 rotates along with the support element 30 relative to the base 10 with the second fixed end 32 serving as a pivot point. After the display module 20 rotates to a certain angle, and since the support element 30 has its length not smaller than the distance between the connecting end 21 of the display module 20 and the first fixed end 31 of the support element 30, the display module 20 can rotate relative to the support element 30 with the first fixed end 31 of the support element 30 serving as the pivot point. Meanwhile, the display module 20 can rotate relative to the sleeve sliding element 121 with the connecting end 21 serving as the pivot point, and the sleeve sliding element 121 will drive the connecting end 21 of the display module 20 to slide from the second area 16 towards the first area 15.

As shown in FIG. 6(c), when the display module 20 continues to rotate with the first fixed end 31 of the support element 30 serving as the pivot point, and when the sleeve sliding element 121 drives the connecting end 21 of the display module 20 to slide towards the first area 15 to a suitable position (such as the end of the rod element 122), then, the portable computer 1 is in an open state. At this time, the display module 20 has rotated to a suitable angle relative to the base 10, with the display place 22 of the display module 20 facing the user. The display module 20 is supported by the support element 30 to form a tilted angle relative to the base 10.

On the other hand, when the user tries to close the portable computer 1, the user can pull the free end 24 of the display module 20, so that the display module 20 is able to rotate around the first fixed end 31 of the support element 30 with the first fixed end 31 serving as the pivot point. The connecting end 21 will be driven by the sleeve sliding element 121 to slide towards the rear end 14 of the base 10 until it slides to the other end of the rod element 122. At this time, the display module 20 rotates around the second fixed end 32 of the support element 30 to return to the closed state.

Therefore, the portable computer 1 only needs to use the sliding assembly 12 disposed at the central position to complete opening/closing functions for the display module without using any complicated linkage elements or structures, thereby reducing the number of required elements and further shrinking the size of the portable computer 1. Besides, the sleeve portion of the sliding assembly 12 is hidden below the slit 162 of the second area 16 to let the display module 20 stay close to the surface 161 of the second area 16. Thus, the portable computer 1 looks integrated and consistent and eliminates the possibility of hurting the user's finger during opening/closing operations.

Specifically, in the embodiments, the sliding assembly 12 is disposed in the central position of the portable computer 1 and does not take up spaces on both sides of the base 10 and the display module 20. With this design, the user can use only one hand to hold the middle of the free end 24 of the display module 20, which corresponds to the position of the sliding assembly 12, to flip or slide the display module 20 smoothly. During this process, the display module 20 can maintain a stable sliding movement to facilitate operations. Furthermore, the user can initiate the opening process by flipping the display module 20 to let the display module 20 slide to a fixed position automatically. The display module 20 is supported by the support element 30 to keep stable without shaking when the user performs touch operations on the display module 20.

In the previous embodiments, each portable computer 1 comprises a single support element 30 disposed at a central position relative to a sliding assembly 12 to achieve the object of the present invention. However, the present invention can have other implementations depending on different user requirements, effects, and mechanism designs. Thus, the number of the elements, the placement of the elements, variations of the size, etc. should be view as included in the scope of the present invention. Please note that the sliding block structures used in each of the below embodiments of the portable computer is illustrated by the sliding assembly 12 of the first embodiment of the present invention, but the sliding assembly 12 can be any other sliding assembly 12a, 12b or similar structure; and the present invention is not limited to the present embodiment.

Figure 7A:
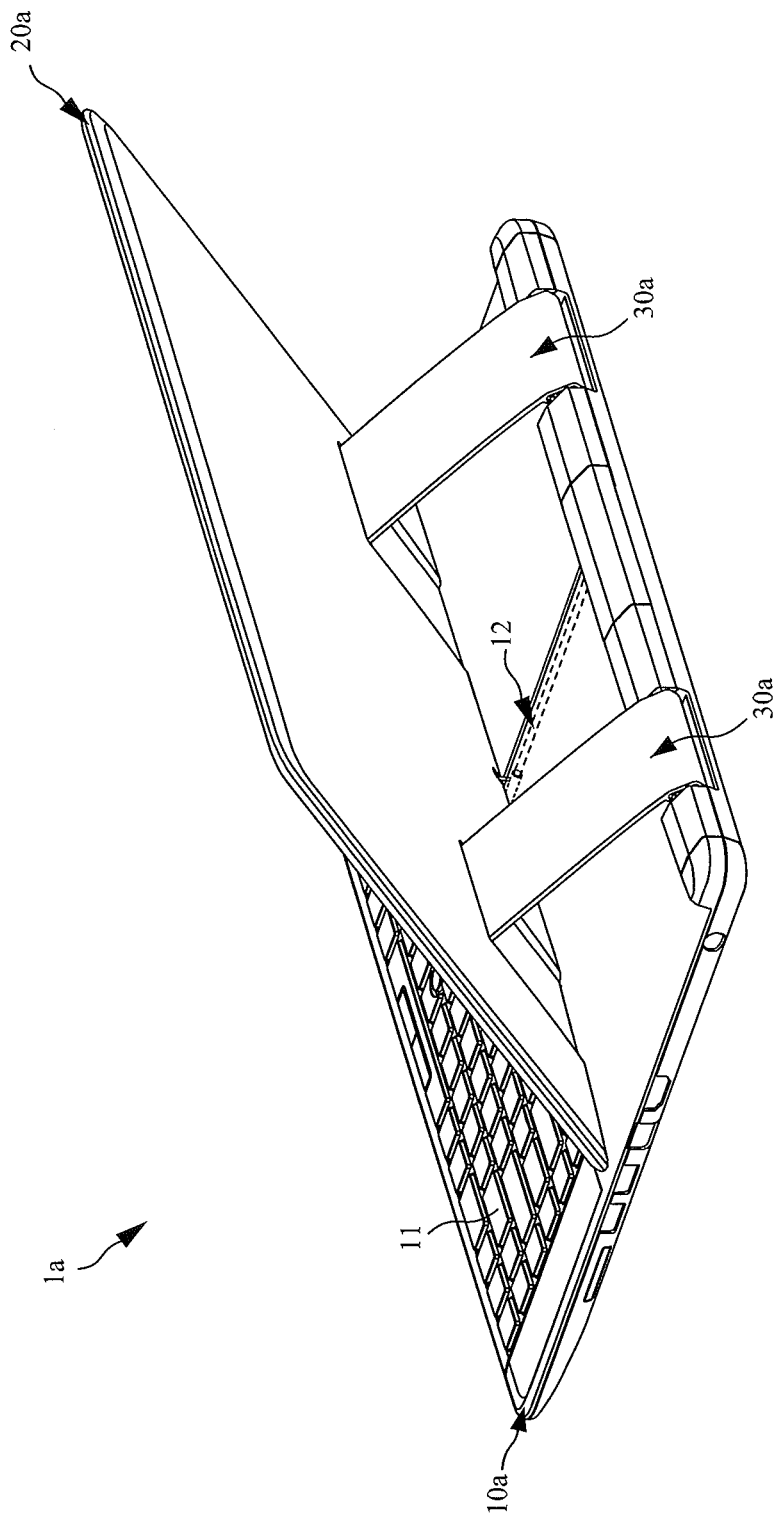
FIG. 7(a) illustrates a schematic view of the second embodiment of the portable computer of the present invention.
Figure 7B:
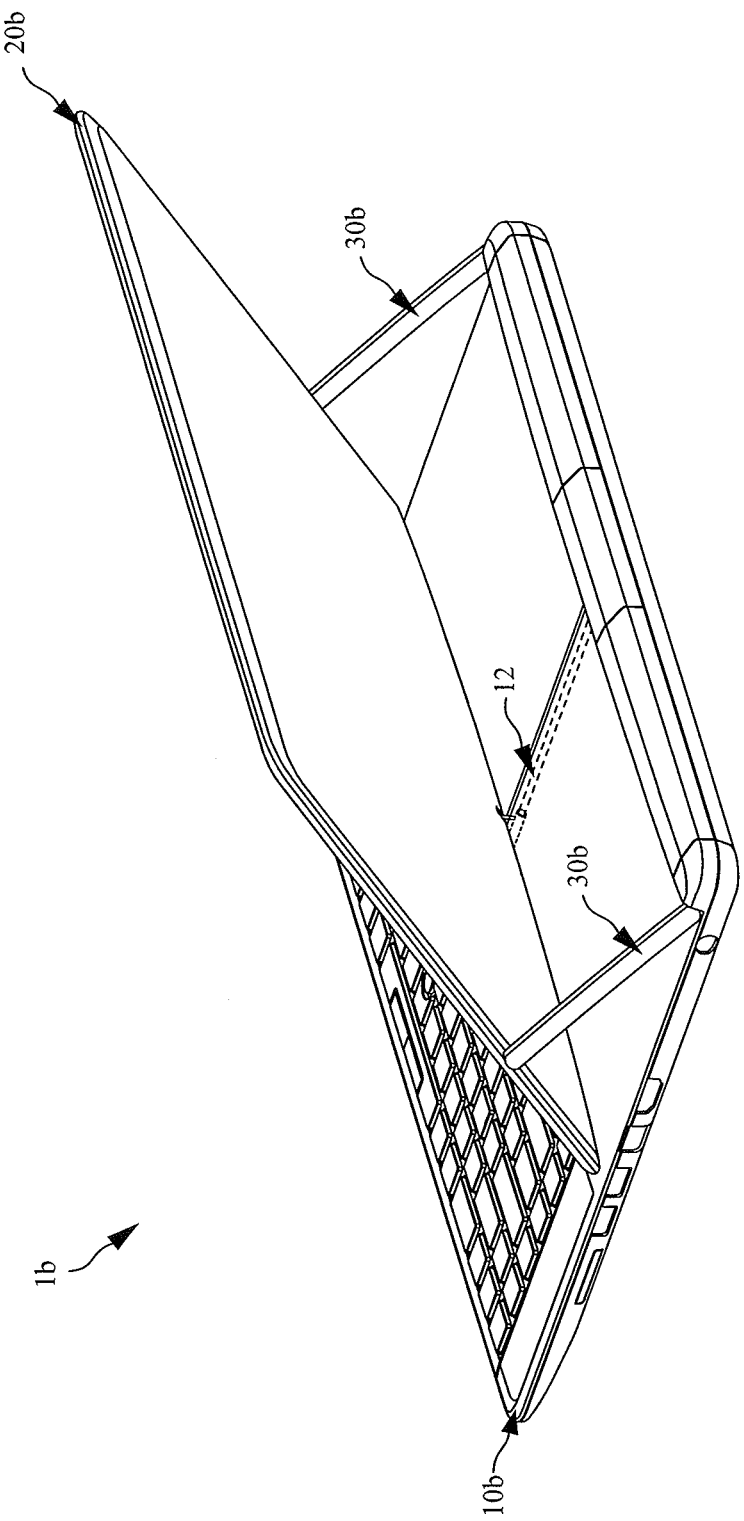
FIG. 7(b) illustrates a schematic view of the third embodiment of the portable computer of the present invention.

For example, please refer to both FIG. 7(a) and FIG. 7(b). FIG. 7(a) illustrates a view of a second embodiment of the portable computer 1a of the present invention; and FIG. 7(b) illustrates a view of a third embodiment of the portable computer 1b of the present invention. Alternatively, the portable computer can use more than one support element to support and stabilize the display module, and the support elements can be disposed at various positions. As shown in FIG. 7(a), in this embodiment, the portable computer 1a comprises a base 10a and two parallely arranged support elements 30a disposed at two sides of the central sliding assembly 12 respectively to form a symmetrical structure. Each support element 30a has one end pivotally connected to a plane of the display module 20a other than the display face, and another end pivotally connected to the rear end of the base. By adding additional support elements (point of support), the present invention can stably support the display module 20a in a sliding movement when it is opening or closing.

Also as Shown in FIG. 7(b), this embodiment is a variation of the previous embodiment. The portable computer 1b comprises a base 10b and two support elements 30bdisposed at two opposite sides near the rear end. The support elements 30b are formed in a long stick-like shape and implemented as connecting rods for reducing the installation space and simplifying the assembling work, thereby enhancing the operations of the display module 20b. However, in other embodiments, the present invention can have various implementations for a plurality of support elements.

Figure 8:
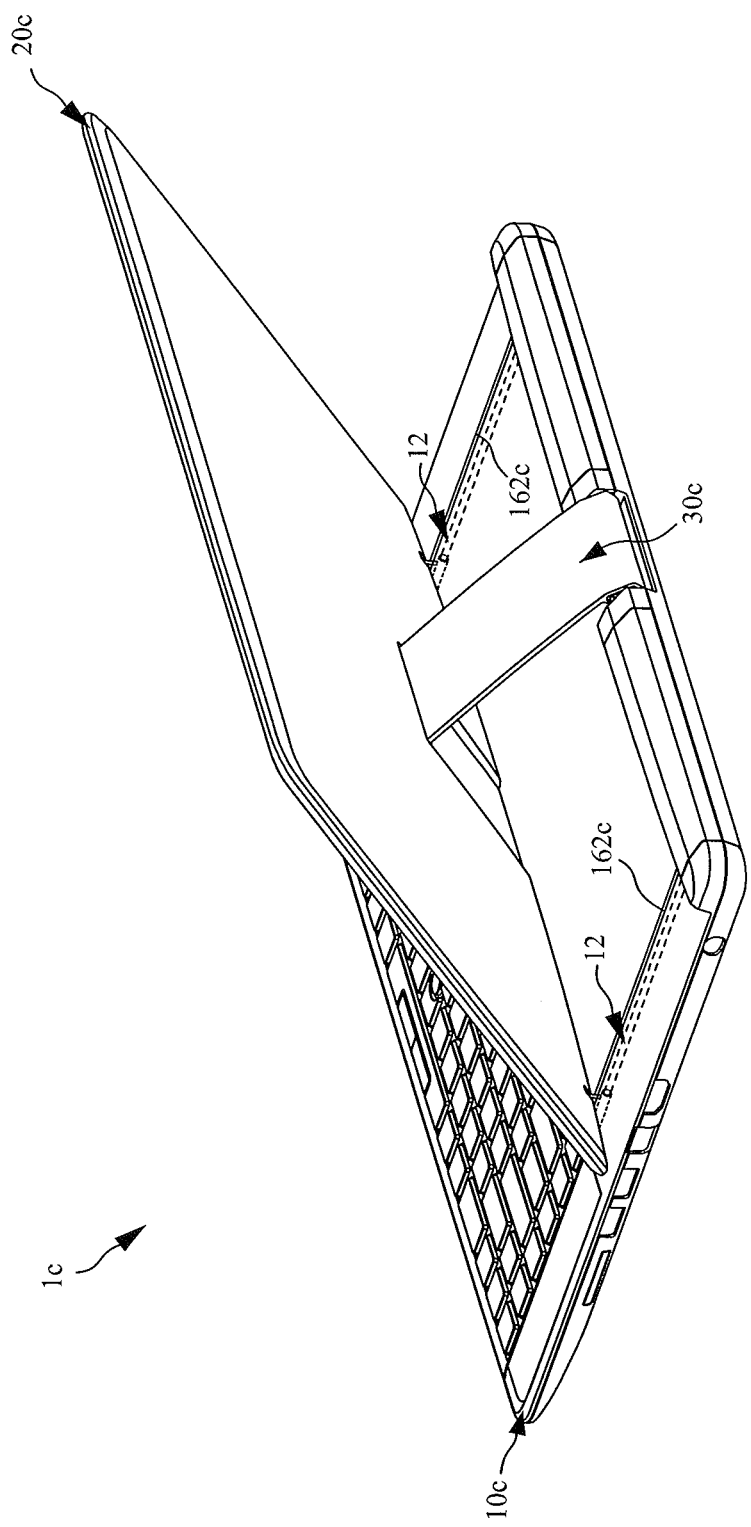
FIG. 8 illustrates a schematic view of a fourth embodiment of the portable computer of the present invention.

Please refer to FIG. 8 for a view of a fourth embodiment of the portable computer 1c of the present invention. Alternatively, in addition to different implementation for the support element, the present invention can also adjust the position of the sliding assembly, the number and positions of slits in the surface of the base to provide various functions. As shown in FIG. 8, in this embodiment, the portable computer 1c comprises two sliding assemblies 12 disposed at two sides of a single support element 30e respectively, and two slits 162c disposed at the base 10e to correspond to the two sliding assemblies 12. The two sliding assemblies 12 and the two slits 162c form a parallel symmetric structure. Therefore, when the display module 20c is opening or closing, the two sliding assemblies 12 can help to stabilize the sliding movement of the display module 20c.

Those skilled in the art can easily know that the three embodiments shown in FIG. 7(a) to FIG. 8 can be further combined to form a portable computer which comprises two support elements and two sliding assemblies. Therefore, it will not be described in detail.

Figure 9:
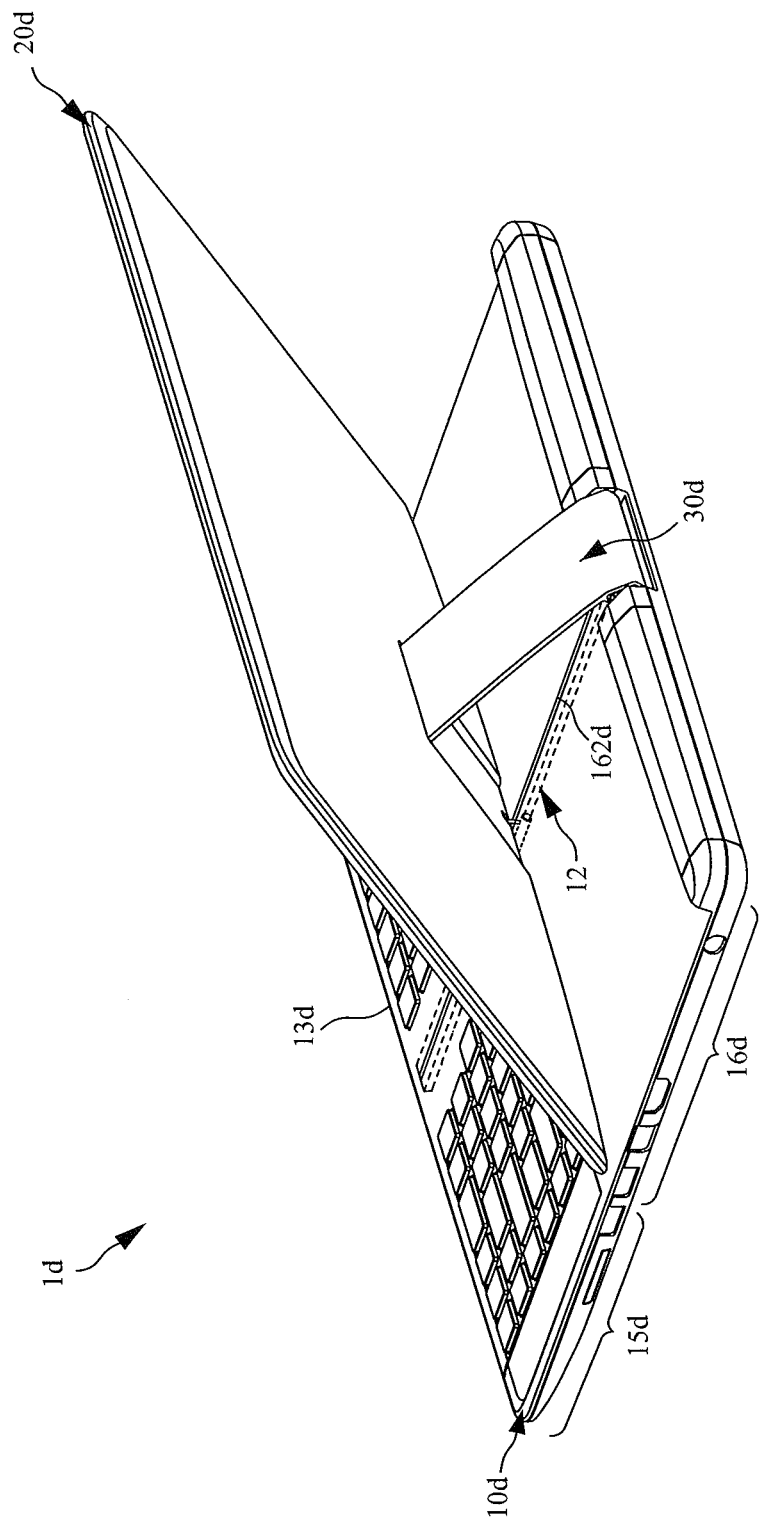
FIG. 9 illustrates a schematic view of a fifth embodiment of the portable computer of the present invention.

Please refer to FIG. 9 for a view of a fifth embodiment of the portable computer 1d of the present invention. The moving distance of the sliding assembly and the length of the corresponding slit can be adjusted according to various design needs. As shown in FIG. 11, in this embodiment, the sliding assembly 12 of the portable computer 1d and a corresponding slit 162d extend from a second area 16d of a base 10d to a first area 15d of the base 10d for extending a sliding distance of a display module 20d and increasing a range of the tilted angle of the display module 20d. Even more, the display module 20d could lie flat on the base 10d to enhance versatility and capability of the portable computer Id. Based on applications and user requirements, the sliding assembly 12 and the corresponding slit 162d can extend to a part or all (that is, approaching the position of a first end 13d) of the first area 15d, and the extended slit can have any characteristics shown in FIG. 7(a) to FIG. 8 or their combination.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer comprising:
    a base comprising, between a front end and a rear end, a first area disposed at a front side of the base and a second area disposed at a rear side of the base;
    a display module comprising a connecting end, a display face, and a support plane opposite to the display face;
    at least one support element, with each support element comprising a first fixed end and a second fixed end, with the first fixed end pivotally connected to a portion of the display module other than the display face, wherein the display module is rotatable relative to the support element, with the second fixed end pivotally connected to the rear end of the base or a proximity of the rear end of the base, wherein the support element is rotatable relative to the base; and
    at least one sliding assembly, with each gliding assembly comprising a rod element and a sleeve sliding element sleeved onto the rod element, wherein the rod element is disposed at least in the second area of the base, wherein the sleeve sliding element is connected with the connecting end of the display module, and wherein the sleeve sliding element slides along the rod element;
    wherein when the display module is opened and rotated an angle relative to the base via the second fixed end of the at least one support element, the display module further rotates around the first fixed end of the at least one support element with the first fixed end serving as a pivot point and driving the connecting end of the display module to move from the second area towards the first area to a suitable position along with the sleeve sliding element, and wherein the display module is supported by the at least one support element to keep a suitable tilted angle.

2. The portable computer as claimed in claim 1, wherein the first area is disposed with a keyboard.

3. The portable computer as claimed in claim 1, wherein the support element has a length not smaller than a distance between the connecting end of the display module and the first fixed end of the support element.

4. The portable computer as claimed in claim 1, wherein the sleeve sliding element comprises a pivoting portion, and wherein the connecting end of the display module is pivotally connected to the sleeve sliding element via the pivoting portion.

5. The portable computer as claimed in claim 4, wherein the sleeve sliding element further comprises a sleeve portion and a connecting portion, wherein the sleeve portion is connected to the pivoting portion via the connecting portion, and wherein the sleeve portion is sleeved onto the rod element for sliding.

6. The portable computer as claimed in claim 5, wherein the base further comprises a surface having a slit, wherein the rod element is disposed below the surface corresponding to the slit, wherein the connecting portion of the sleeve sliding element goes through the slit to protrude the pivoting portion and a portion of the connecting portion out of the surface, and wherein the slit has a width smaller than an outside diameter of the sleeve portion.

7. The portable computer as claimed in claim 6, wherein the pivoting portion and the surface of the base are spaced apart by a spacing.

8. The portable computer as claimed in claim 5, wherein the sleeve portion is made of a material with a lubricant effect.

9. The portable computer as claimed in claim 5, wherein the rod element is applied with lubricating oil to reduce friction with the sleeve portion.

10. The portable computer as claimed in claim 5, wherein the sleeve portion is a hollow cylinder sleeved around the rod element for sliding.

11. The portable computer as claimed in claim 5, wherein the sleeve portion is a C-shaped structure placed across the rod element for sliding.

12. The portable computer as claimed in claim 5, wherein the sliding assembly further comprises at least one positioning element fixed to the base and having a positioning portion, wherein the positioning element is disposed to a fixed point adjacent to the rod element, wherein the sleeve sliding element further comprises another positioning portion; and wherein when the sleeve portion slides to the fixed point along the rod element, the sleeve sliding element is positioned by the timely interference of the two positioning portions of the positioning element and the sleeve sliding element.

13. The portable computer as claimed in claim 1, wherein when the display module overlaps with the base in a closed state, the connecting end of the display module and the second fixed end of the support element remain on the same axis.

14. The portable computer as claimed in claim 1, wherein when the display module overlaps with the base in a closed state, the connecting end of the display module and the second fixed end of the support element are respectively on different axes substantially parallel with each other.

15. The portable computer as claimed in claim 6, wherein the surface having the slit corresponds to the second area, and wherein the rod element is disposed correspondingly below the surface of the second area corresponding to the slit.

16. The portable computer as claimed in claim 6, wherein the surface having the slit comprises the second area and at least part of or all of the first area, and wherein the rod element is disposed correspondingly below the surface comprising the second area and at least part of or all of the first area corresponding to the slit.

17. The portable computer as claimed in claim 1, wherein the at least one support element comprises two support elements arranged in parallel.

18. The portable computer as claimed in claim 1, wherein the at least one sliding assembly comprises two sliding assemblies disposed in parallel and spaced apart, wherein the two rod elements are disposed in parallel at least in the second area, and wherein each sleeve sliding element is respectively connected with the connecting end of the display module corresponding to each of the rod element.

19. The portable computer as claimed in claim 1, wherein the at least one sliding assembly comprises a single sliding assembly disposed at the central position of at least the second area of the base, wherein the rod element is disposed at the central position of at least the second area of the base, and wherein the sleeve sliding element is correspondingly disposed at the central position of the connecting end of the display module.

20. The portable computer as claimed in claim 1, wherein each sliding assembly further comprises a driving device, wherein the driving device is connected to the rod element, and wherein the driving device drives the rod element to drive the sleeve sliding element sleeved onto the rod element to slide along the rod element.

21. The portable computer as claimed in claim 20, wherein the rod element is a rod element having a thread, and wherein an inner wall of the sleeve sliding element has an internal thread associated with the thread.

22. The portable computer as claimed in claim 20, wherein the driving device comprises at least one limit switch, wherein operations of the driving device is stopped by triggering the at least one limit switch.

23. The portable computer as claimed in claim 20, wherein each sliding assembly further comprises an operating element disposed to the surface of the base or the display module, and wherein the operating element is electrically connected to the driving device to control operations of the driving device via the operating element.

24. The portable computer as claimed in claim 1, wherein the sleeve sliding element is rotatably and pivotally connected with the connecting end of the display module.

* * * * *